US006024180A

United States Patent [19]
Lin

[11] Patent Number: 6,024,180
[45] Date of Patent: Feb. 15, 2000

[54] CAGE DEVICE FOR A PNEUMATICALLY DRIVEN POWER TOOL

[76] Inventor: Chen-Yang Lin, No. 52-1, Lane 490, Chung Cheng S. Rd., Yang-Kang City Tainan Hsien, Taiwan

[21] Appl. No.: 09/328,601

[22] Filed: Jun. 10, 1999

[30] Foreign Application Priority Data

| | | | |
|---|---|---|---|
| Feb. 12, 1998 | [TW] | Taiwan | 88202707 |
| Aug. 11, 1998 | [TW] | Taiwan | 81204560 A03 |

[51] Int. Cl.$^{7}$ .................... B23Q 5/00
[52] U.S. Cl. .................... 173/93.5; 173/93
[58] Field of Search .................... 173/93, 93.5, 176

[56] References Cited

U.S. PATENT DOCUMENTS

| | | | |
|---|---|---|---|
| 3,144,108 | 8/1964 | Reynolds | 173/93.5 |
| 3,321,043 | 5/1967 | Vaughn | 173/93.5 |
| 3,533,479 | 10/1970 | Madsen et al. | 173/93.5 |
| 5,435,398 | 7/1995 | Juan | 173/93 |
| 5,887,666 | 3/1999 | Chen et al. | 173/93 |

*Primary Examiner*—Scott A. Smith
*Attorney, Agent, or Firm*—Finnegan, Henderson, Farabow, Garrett & Dunner, L.L.P.

[57] ABSTRACT

A cage device includes front and rear end plates respectively provided with front and rear major walls, and spaced apart from each other in a longitudinal direction. The rear major wall is in a splined connection with and driven by a drive output shaft of an air motor, and is formed with a pair of first pin holes which are diametrically spaced apart from each other. The front major wall is formed with an inserting hole for sleeving rotatably on a power output shaft, and a pair of second pin holes which are diametrically spaced apart from each other relative to the inserting hole. Opposite tilt and limit pins are provided with two first secured ends and two second secured ends respectively to be inserted into and in tight connection with, in the longitudinal direction, the first and second pin holes so as to define a space therein. The space can accommodate an impact receiving anvil jaw on the power output shaft and an annular hammer member such that the tilt and limit pins are received in a longitudinal groove and a limiting notch of the hammer member. As such, the problem of forming elongate slots in the cage device can be obviated.

5 Claims, 5 Drawing Sheets

CAGE DEVICE FOR A PNEUMATICALLY DRIVEN POWER TOOL

BACKGROUND OF THE INVENTION

1. Field of the Invention

This invention relates to a pneumatically driven power tool, more particularly to a cage device for a rotary impact mechanism of a pneumatically driven power tool.

2. Description of the Related Art

Referring to FIG. 1, a conventional rotary impact mechanism 1 is shown to include a hollow cage member 11, two hammer members 12, two pins 13, and a power output shaft 14.

The cage member 11 is coaxially mounted around the output shaft 14, and is rotatable with respect to the output shaft 14. The cage member 11 includes a pair of longitudinally spaced end plates 111 joined by a pair of diametrically spaced connecting portions 112 so as to form a space 113 therein. The pins 13 are inserted fixedly into two elongate slots 114 formed in the connecting portions 112 and extending through the end plates 111. An air motor 17 has a drive output shaft 171 engaging an engaging hole 116 of the rear end plate 111. The power output shaft 14 is inserted into the space 113 via an inserting hole 115 of the front end plate 111, and has an impact receiving anvil jaw with two impact receiving surfaces 141.

The hammer members 12 are disposed to surround the power output shaft 14. Each hammer member 12 includes an inner annular wall 123 with two impact jaws 124 to intermittently engage and disengage the impact receiving surfaces 141, and an outer annular wall which has a groove 121 and a limiting notch 122 respectively engaging with the pins 13 such that each hammer member 12 is pivotable relative to one of the pins 13, thereby bringing the impact jaws 124 to exert an instant impact on the impact receiving surfaces 141.

The conventional cage member 11 is generally made from a metal block to form the end plates 111 and the connecting portions 112, and the elongate slots 114 need to be machined longitudinally therein in a precise manner, thereby resulting in inconvenience during the manufacture of the cage member 11.

SUMMARY OF THE INVENTION

The object of the present invention is to provide a cage device which is easy to fabricate at a relatively low manufacturing cost.

According to this invention, the cage device includes front and rear end plates respectively provided with front and rear major walls, and disposed to be spaced apart from each other in a longitudinal direction. The rear major wall is in a splined connection with and driven by a drive output shaft of an air motor, and forms a pair of first pin holes which are diametrically spaced apart from each other. The front major wall forms an inserting hole which is rotatably sleeved on a power output shaft, and a pair of second pin holes which are diametrically spaced apart from each other relative to the inserting hole. Opposite tilt and limit pins are provided with two first secured ends and two second secured ends, respectively. Each of the first secured ends and each of the second secured ends are inserted into and in tight connection with, in the longitudinal direction, one of a pair of the first and second pin holes, and a corresponding one of the other pair of the first and second pin holes respectively so as to define a space therein. The space can accommodate an impact receiving anvil jaw on the power output shaft and an annular hammer member. In particular, the inserted tilt pin is received in a longitudinal groove of the hammer member to form a tilting axis such that the hammer member is pivotable relative to the tilt pin to swing about the tilting axis. The limit pin is received in and is in sliding contact with a limiting notch of the hammer member opposite to the longitudinal groove so as to limit swinging extent of the hammer member to enable the rear major wall to drive the annular hammer member to rotate relative to the power output shaft.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
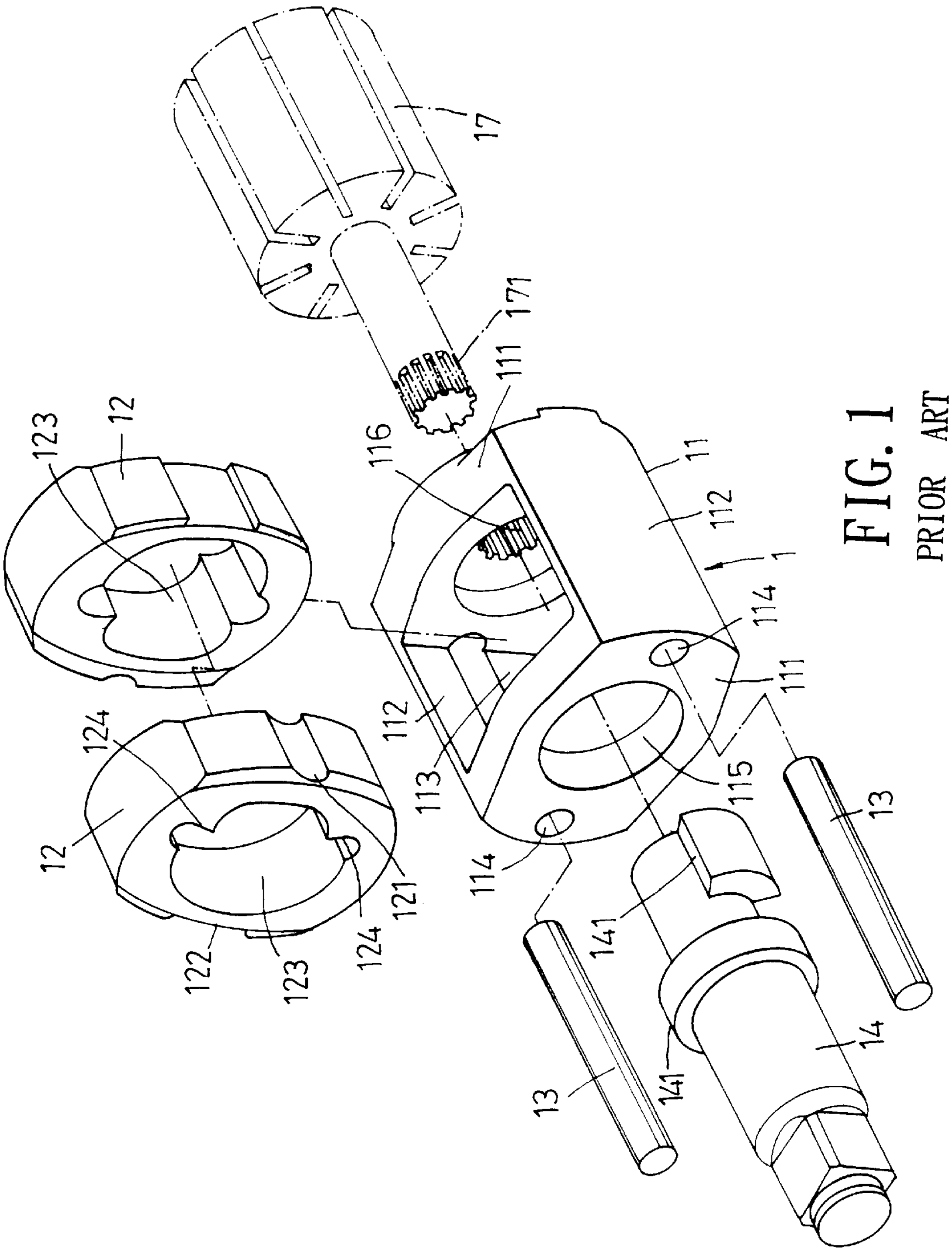
FIG. 1 PRIOR ART
FIG. 1 is an exploded view of a conventional rotary impact mechanism of a pneumatically driven power tool.
Figure 2:
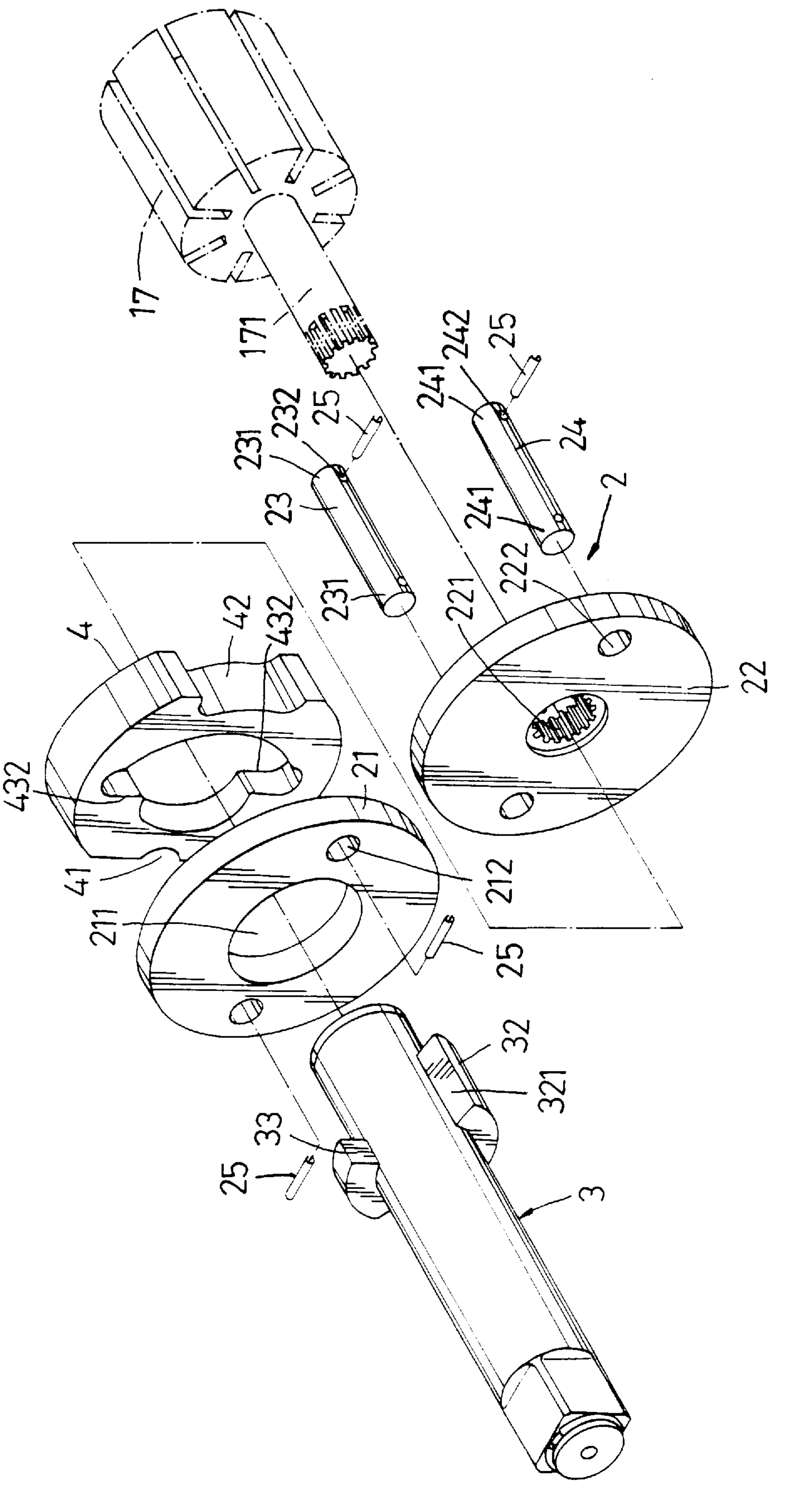
FIG. 2 is an exploded view of a preferred embodiment in combination with a rotary impact mechanism of a pneumatically driven power tool according to this invention.
Figure 5:
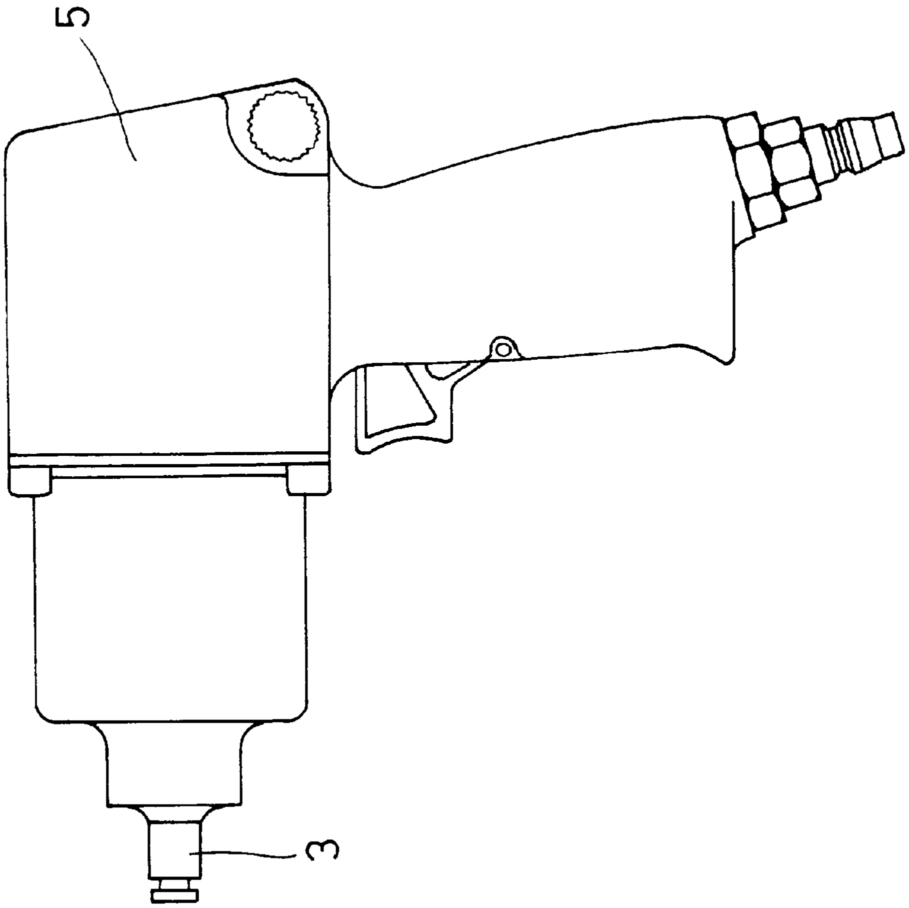
FIG. 5 is a schematic view showing the power tool.

Referring to FIGS. 2 and 5, the preferred embodiment of the cage device 2 according to the present invention is shown to be used for a rotary impact mechanism of a pneumatically driven power tool. The impact mechanism includes a housing 5 and an air motor 17 with a drive output shaft 171 which is rotatably mounted in the housing 5 about a first axis.

Figure 3:
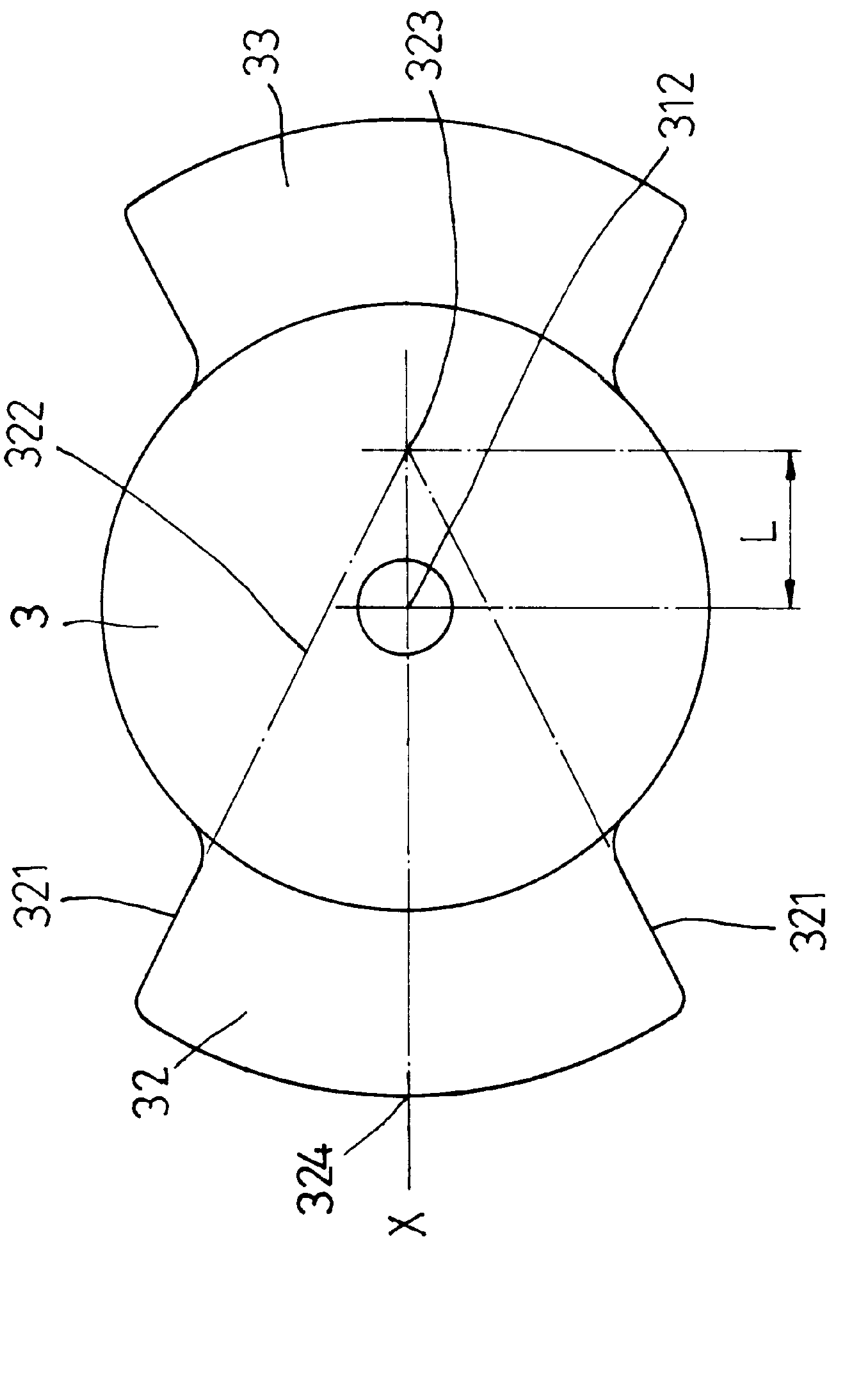
FIG. 3 is a rear view of a power output shaft of the power tool according to the preferred embodiment.

With reference to FIG. 3, a power output shaft 3 is mounted on the housing 5 for rotation and is axially spaced apart from the drive output shaft 171. An impact receiving anvil jaw 32 and a balancing anvil jaw 33 are disposed to extend outwardly and radially from the power output shaft 3, and are diametrically opposite to each other relative to the power output shaft 3. The impact receiving anvil jaw 32 provides forward and reverse impact receiving surfaces 321.

Figure 4:
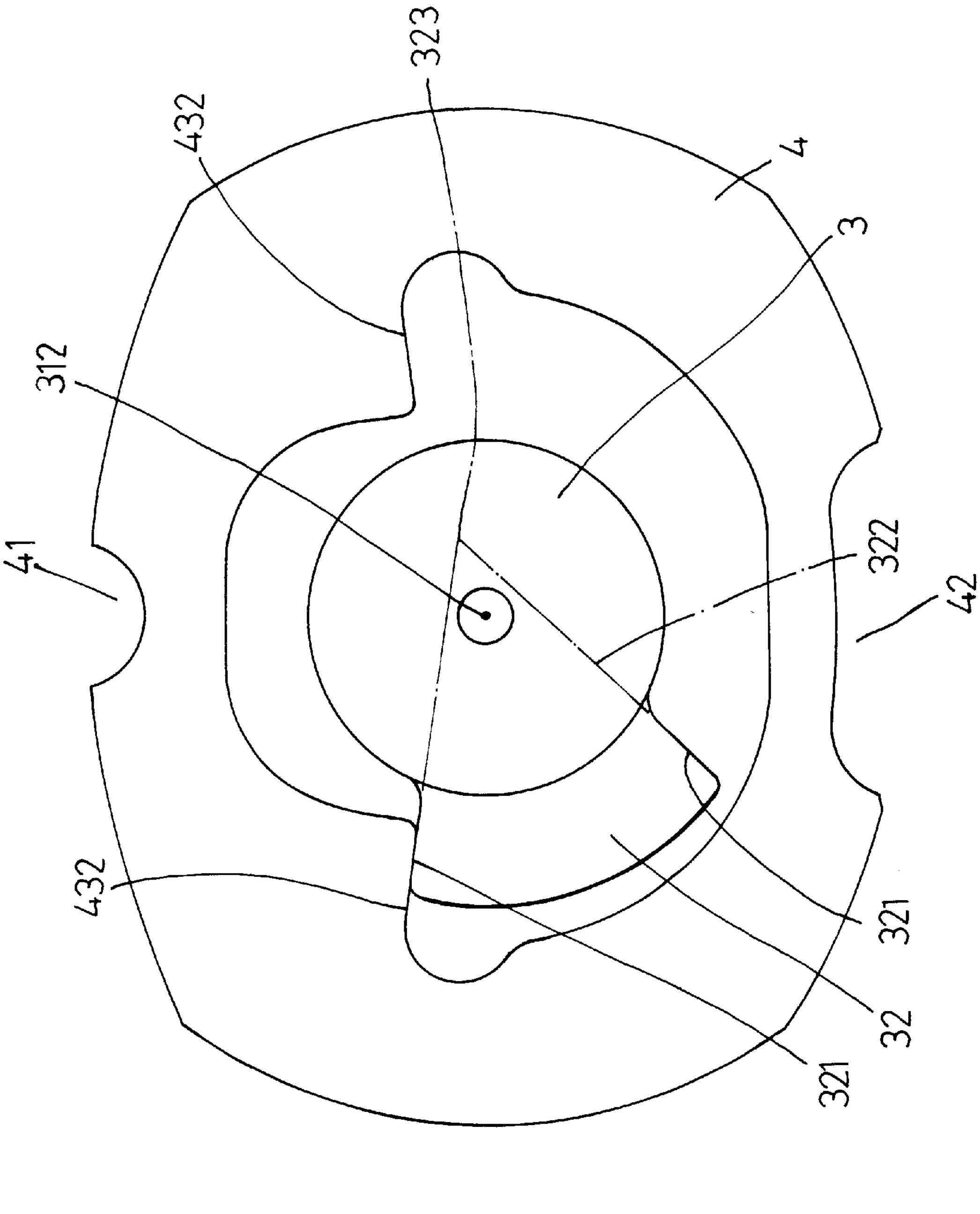
FIG. 4 is a schematic view showing a clutch portion of the power tool in its impact position.

An annular hammer member 4 is disposed to surround and to be angularly movable relative to the power output shaft 3. The hammer member 4 has an inner annular wall with two clockwise impact jaws 432 thereon to intermittently engage and disengage the forward and reverse impact receiving surfaces 321 of the impact receiving anvil jaw 32, as shown in FIG. 4. Thus, once the annular hammer member 4 has completed a predetermined angular displacement relative to the power output shaft 3 around a second axis parallel to the first axis while the inner annular wall thereof is released from the engagement with the impact receiving surface 321, the hammer member 4 enables an instant impact on the impact receiving surface 321. The hammer member 4 further has an outer annular wall opposite to the inner annular wall in a radial direction. The outer annular wall defines a longitudinal groove 41 therein which extends in a first longitudinal direction parallel to the first axis, and a limiting notch 42 therein which is diametrically opposite to the longitudinal groove 41 and which extends angularly and in the first longitudinal direction.

The cage device 2 of the preferred embodiment is shown to comprise front and rear end plates 21,22 which are respectively provided with front and rear major walls, and which are disposed to be spaced apart from each other in a second longitudinal direction with the front and rear major walls opposite to each other. The rear major wall has an engaging hole 221 in a splined connection with the drive output shaft 171 to be driven by the same to rotate about the first axis, and defines a pair of first pin holes 222 which are diametrically spaced apart from each other relative to the first axis and which respectively extend in the second longitudinal direction. The front major wall defines an inserting hole 211 which is rotatably sleeved on the power output shaft 3, and a pair of second pin holes 212 which are diametrically spaced apart from each other relative to the inserting hole 211.

Opposite tilt and limit pins 23,24 are provided with two first secured ends 231 and two second secured ends 241, respectively. Each first secured end 231 and each second secured end 241 are inserted into, in the second longitudinal direction, one of a pair of the first and second pin holes 212,222, and a corresponding one of the other pair of the first and second pin holes 212,222 respectively so as to define a space therein. Each of the tilt and limit pins 23,24 has two inserting bores 232,242 which are disposed in the secured ends 231,241, respectively. Each inserting bore 232,242 extends through the secured end 231,241 in a direction transverse to the second longitudinal direction. Four resilient lockpins 25 of a C-shaped cross-section are disposed to be retainingly inserted into the inserting bores 232,242 and to be outboard to the front and rear end plates 21,22 so as to bias the front and rear end plates 21,22 towards each other in the second longitudinal direction. As such, the tilt and limit pins 23,24 are in tight connection with the first and second pin holes 212,222. The space accommodates the impact receiving anvil jaw 32, the balancing anvil jaw 33 and the annular hammer member 4 with the first longitudinal direction parallel to the second longitudinal direction. The tilt pin 23 is received in the longitudinal groove 41 to form a tilting axis parallel to the first axis such that the annular hammer member 4 is retainingly pivotable relative to the tilt pin 23 to swing about the tilting axis. The limit pin 24 is received in and is in sliding contact with the limiting notch 42 so as to limit the swinging extent of the annular hammer member 4, thereby enabling the rear major wall to drive the annular hammer member 4 to rotate relative to the power output shaft 3. As such, the clockwise anvil jaw 432 is brought to exert the instant impact on the impact receiving surface 321.

As illustrated, the cage device 2 of the preferred embodiment according to this invention is constructed by the front and rear end plates 21,22 and the tilt and limit pins 23,24, and the first and second pin holes 212,222 and the inserting hole 211 are formed by punching press, thereby resulting in convenience during assembly, and reducing the manufacturing cost of the cage device 2.

In addition, as shown in FIG. 3, preferably, the intersecting point 323 between extension lines 322 of the forward and reverse impact receiving surfaces 321 is located on a line (X) which is defined by centers 324,312 of the outer periphery of the impact receiving anvil jaw 32 and the power output shaft 3. Moreover, the intersecting point 323 is proximate to the balancing anvil jaw 33 relative to the center 312 of the power output shaft 3. The distance (L) between the center 312 and the intersecting point 323 is desired to be about 1–6 mm, preferably about 4.2 mm. Thus, the clockwise impact jaw 432 can disengage easily from the impact receiving anvil jaw 32 when encountering a resistance of the power output shaft 3 for continued rotation to impact again the impact receiving anvil jaw 32, and the impact effect of the clockwise impact jaw 432 on the impact receiving anvil jaw 32 can be increased.

In addition, a plurality of annular hammer members 4 may be disposed on the impact mechanism, and the hammer members 4 may be assembled on the power output shaft 3 in opposite directions. That is, the longitudinal groove 41 of one hammer member 4 is aligned with the limiting notch 42 of another hammer member 4 for balancing purposes.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A cage device for a pneumatically driven power tool which includes:

a housing;

an air motor with a drive output shaft rotatably mounted in the housing about a first axis;

a power output shaft mounted on the housing for rotation and axially spaced apart from the drive output shaft;

an impact receiving anvil jaw extending outwardly and radially from the power output shaft;

an annular hammer member disposed to surround and to be angularly movable relative to the power output shaft, and including:

an inner annular wall with a clockwise impact jaw thereon to intermittently engage and disengage the impact receiving anvil jaw so as to enable an instant impact on the impact receiving anvil jaw once the annular hammer member has completed a predetermined angular displacement relative to the power output shaft around a second axis parallel to the first axis while the inner annular wall is released from the engagement with the impact receiving anvil jaw, and an outer annular wall opposite to the inner annular wall in a radial direction, and defining a longitudinal groove therein which extends in a first longitudinal direction parallel to the first axis, and a limiting notch therein which is diametrically opposite to the longitudinal groove and which extends angularly and in the first longitudinal direction, said cage device comprising:

front and rear end plates respectively provided with front and rear major walls, and disposed to be spaced apart from each other in a second longitudinal direction with said front and rear major walls opposite to each other, said rear major wall being adapted to be in a splined connection with and to be driven by the drive output shaft to rotate about the first axis, and defining a pair of first pin holes which are diametrically spaced apart from each other relative to the first axis and which respectively extend in the second longitudinal direction, said front major wall defining an inserting hole adapted to be rotatably sleeved on the power output shaft, and a pair of second pin holes which are diametrically spaced apart from each other relative to said inserting hole; and opposite tilt and limit pins provided with two first secured ends and two second secured ends respectively, each of said first secured ends and each of said second secured ends being disposed to be inserted into and being in tight connection with, in the second longitudinal direction, one of a pair of said first and second pin holes, and a corresponding one of the other pair of said first and second pin holes respectively so as to define a space therein, said space being adapted to accommodate the impact receiving anvil jaw and the annular hammer member with the first longitudinal direction parallel to the second longitudinal direction, said tilt pin being adapted to be received in the longitudinal groove to form a tilting axis parallel to the first axis such that the annular hammer member is retainingly pivotable relative to said tilt pin to swing about the tilting axis, said limit pin being adapted to be received in and in slidable contact with the limiting notch so as to limit swinging extent of the annular hammer member in order to enable said rear major wall to drive the annular hammer member to rotate relative to the power output shaft, thereby bringing the clockwise anvil jaw to exert the instant impact on the impact receiving anvil jaw.

2. The cage device as claimed in claim 1, wherein each of said tilt and limit pins has two inserting bores respectively disposed in each pair of said two first secured ends and said two second secured ends and outboard to said front and rear end plates respectively, each of said inserting bores extending therethrough in a direction transverse to the second longitudinal direction, said cage device further comprising four lockpins each being retainingly inserted into a respective one of said inserting bores so as to effect the tight connection of said tilt and limit pins within said first and second pin holes.

3. The cage device as claimed in claim 2, wherein each of said lockpins is resilient and is of a C-shaped cross-section such that said front and rear end plates are biased towards each other in the second longitudinal direction.

4. A pneumatically driven power tool, comprising:

a housing;

an air motor with a drive output shaft rotatably mounted in said housing about a first axis;

a power output shaft mounted on said housing for rotation and axially spaced apart from said drive output shaft;

an impact receiving anvil jaw extending outwardly and radially from said power output shaft;

an annular hammer member disposed to surround and to be angularly movable relative to said power output shaft, said annular hammer member including:

an inner annular wall with a clockwise impact jaw thereon to intermittently engage and disengage said impact receiving anvil jaw so as to enable an instant impact on said impact receiving anvil jaw once said annular hammer member has completed a predetermined angular displacement relative to said power output shaft around a second axis parallel to the first axis while said inner annular wall is released from the engagement with said impact receiving anvil jaw, and an outer annular wall opposite to said inner annular wall in a radial direction, and defining a longitudinal groove therein which extends in a first longitudinal direction parallel to the first axis, and a limiting notch therein which is diametrically opposite to said longitudinal groove and which extends angularly and in the first longitudinal direction; and a cage device including:

front and rear end plates respectively provided with front and rear major walls, and disposed to be spaced apart from each other in a second longitudinal direction with said front and rear major walls opposite to each other, said rear major wall being in a splined connection with and being driven by said drive output shaft to rotate about the first axis, and defining a pair of first pin holes which are diametrically spaced apart from each other relative to the first axis and which respectively extend in the second longitudinal direction, said front major wall defining an inserting hole rotatably sleeved on said power output shaft, and a pair of second pin holes which are diametrically opposite from each other relative to said inserting hole;

opposite tilt and limit pins provided with two first secured ends and two second secured ends respectively, each of said first secured ends and each of said second secured ends being inserted into and being in tight connection with, in the second longitudinal direction, one of a pair of said first and second pin holes, and a corresponding one of the other pair of said first and second pin holes respectively so as to define a space therein, said space accommodating said impact receiving anvil jaw and said annular hammer member with the first longitudinal direction parallel to the second longitudinal direction, said tilt pin being received in said longitudinal groove to form a tilting axis parallel to the first axis such that said annular hammer member is retainingly pivotable relative to said tilt pin to swing about the tilting axis, said limit pin being received in and being in sliding contact with said limiting notch so as to limit swinging extent of said annular hammer member in order to enable said rear major wall to drive said annular hammer member to rotate relative to said power output shaft, thereby bringing said clockwise anvil jaw to exert the instant impact on said impact receiving anvil jaw.

5. The pneumatically driven power tool as claimed in claim 4, wherein a radial line is intersected radially between the tilting axis and the first axis, said clockwise impact jaw defining an extension line which intersects with the radial line.

* * * * *